Aug. 5, 1969  H. P. QUINN  3,460,020
PHASE-CONTROLLED VOLTAGE REGULATOR
Filed Aug. 11, 1967  4 Sheets-Sheet 1
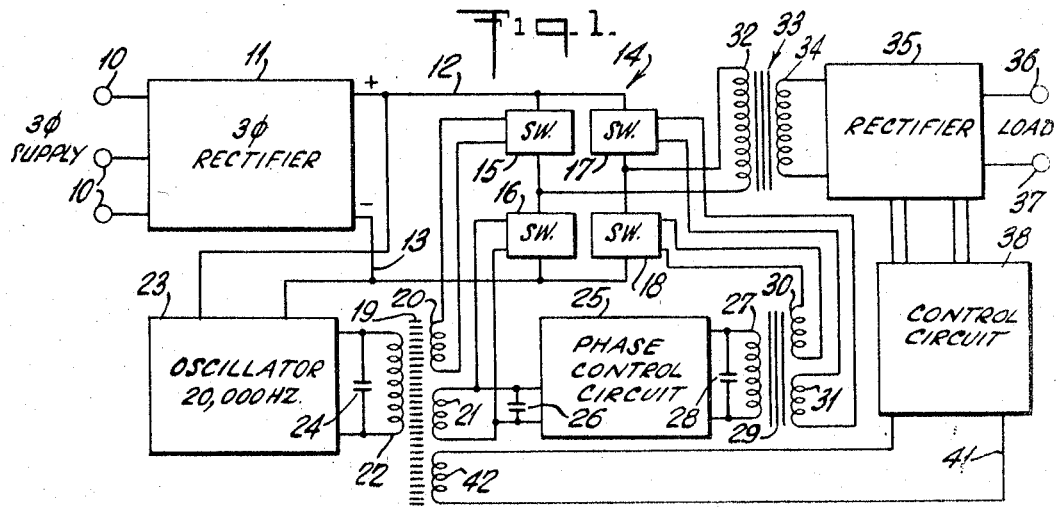
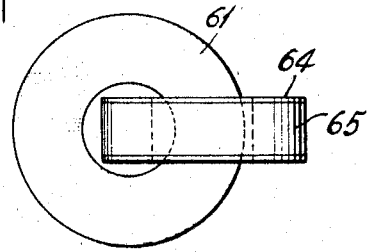
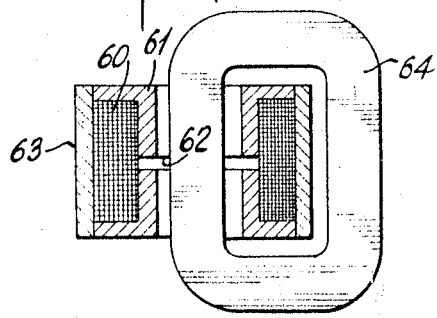
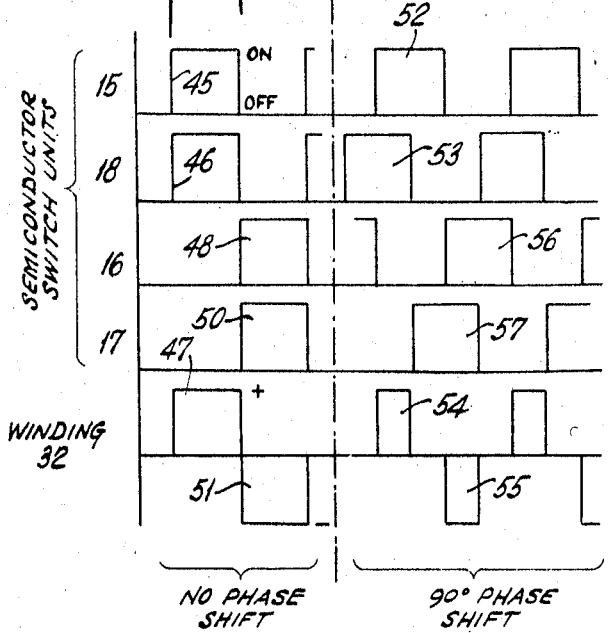
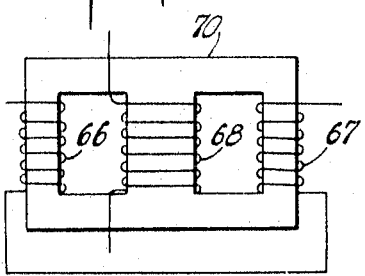
INVENTOR
HALSEY P. QUINN
BY
Eyre, Mann & Lucas
ATTORNEYS

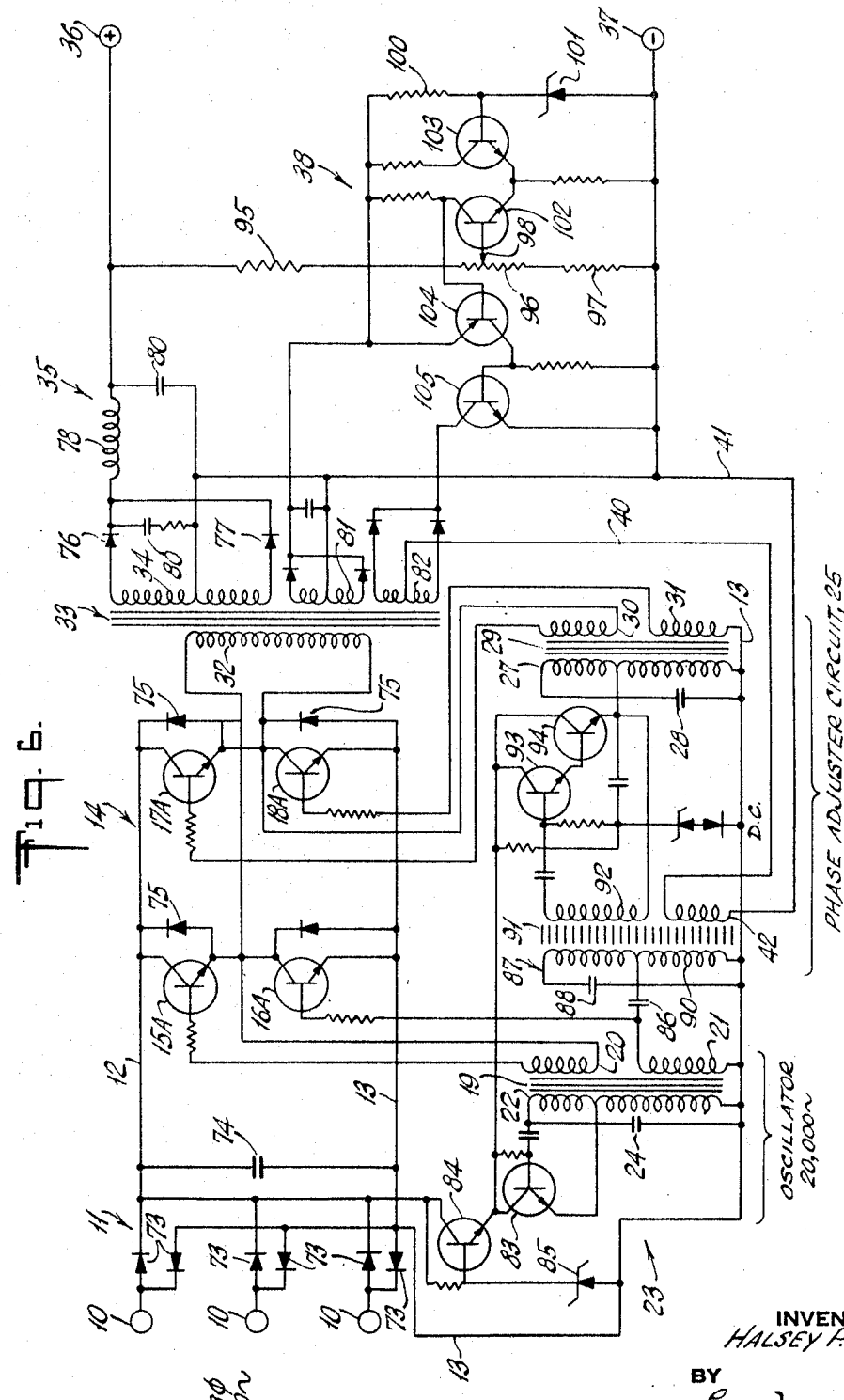

Aug. 5, 1969  H. P. QUINN  3,460,020
PHASE-CONTROLLED VOLTAGE REGULATOR
Filed Aug. 11, 1967  4 Sheets-Sheet 3

INVENTOR
HALSEY P. QUINN
BY
Eyre, Mann & Lucas
ATTORNEYS

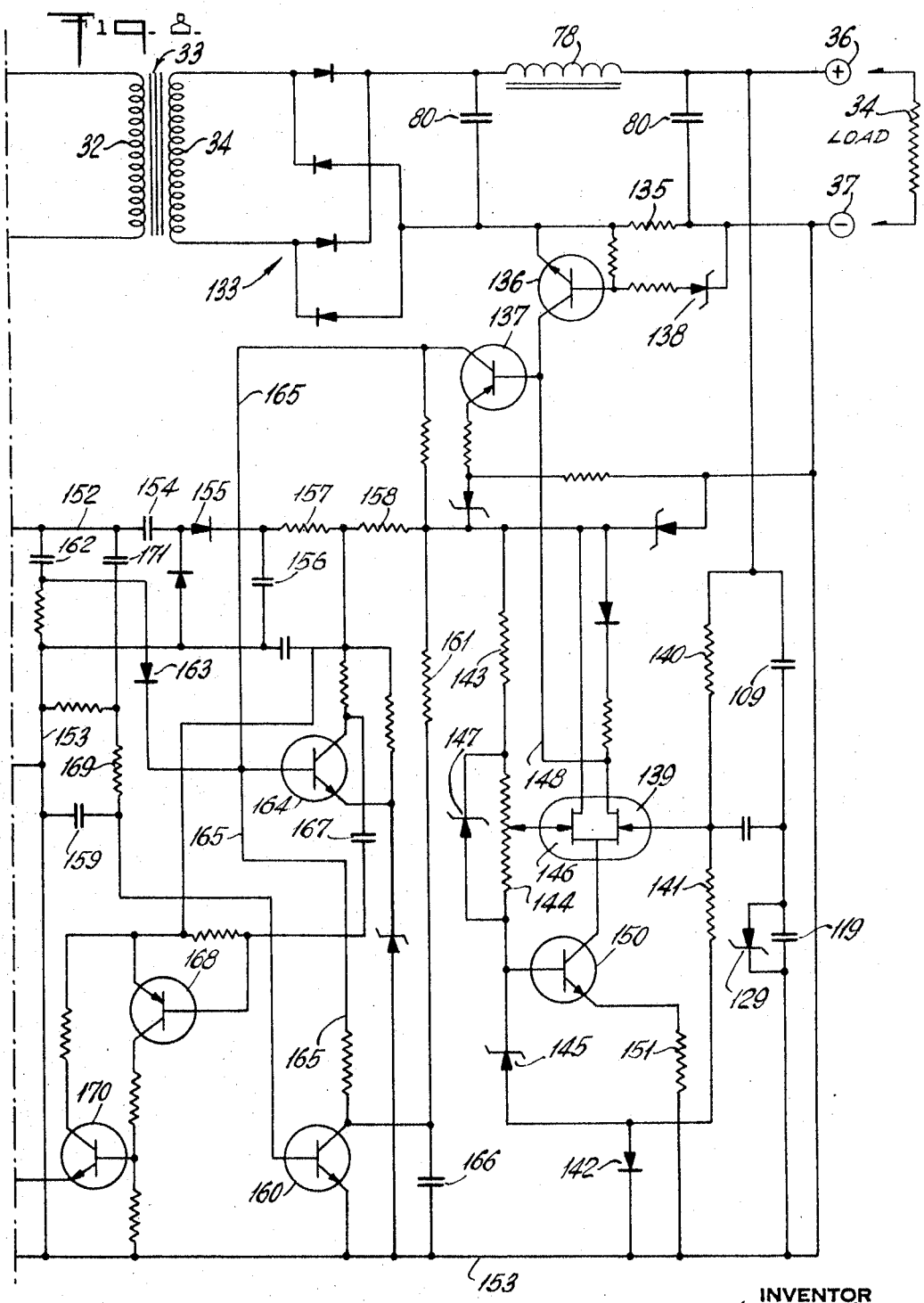

United States Patent Office 3,460,020
Patented Aug. 5, 1969

3,460,020
PHASE-CONTROLLED VOLTAGE REGULATOR
Halsey P. Quinn, Morris Plains, N.J., assignor to Wagner Electric Corporation, a corporation of Delaware
Filed Aug. 11, 1967, Ser. No. 659,930
Int. Cl. H02m 7/20, 3/32
U.S. Cl. 321—2     8 Claims

ABSTRACT OF THE DISCLOSURE

A voltage regulator rectifies an AC power supply and applies a regulated DC voltage to a load. The AC power is first rectified, a portion of the power is applied to a switching bridge circuit, and some of the power is applied to an oscillator circuit which in turn controls the bridge switching units. A phase adjuster circuit controls the relative phase of the switching units and a rectifier is connected between the bridge and the load. The usual voltage reference component (Zener diode) and an amplifier control the phase changing circuit.

---

This invention relates to a voltage regulator circuit for controlling direct current power. The output voltage is regulated to remain within a narrow range of voltage values and the response time is much shorter than in prior regulator circuits. Four semi-conductor switches are arranged in a bridge circuit and they are controlled to turn on and off so as to produce a composite square wave output, the voltage of which can be varied by adjusting the phase between switching units. A quick response is obtained by generating a pulse frequency which is considerably higher than the usual sixty cycles. A frequency of 20,000 cycles per second has been found satisfactory for operating the bridge switching units.

The circuit comprises a first rectifier for changing the AC power to direct current. A four component semiconductor switching circuit is connected to the direct current supply and produces a square-topped wave output. An oscillator circuit is also connected to the direct current supply and is arranged to operate at about 20,000 hertz for controlling the bridge switching units. One pair of switching units receives its controlling voltage directly from the oscillator. The other pair receives its control voltage from an adjustable phase adjuster circuit to control the output voltage. The adjustable phase adjuster circuit is controlled by a voltage reference component coupled to the output voltage which changes the phase of two of the switching components to regulate the voltage output.

FIG. 1 is a schematic diagram of the regulator showing most of the circuits in block form.

FIG. 2 is a top view of one form of saturable reactor which can be used as a circuit component.

FIG. 3 is a cross sectional view of the reactor shown in FIG. 2.

FIG. 4 is a side view of another form of saturable reactor which can be used in place of the reactor shown in FIGS. 2 and 3.

FIG. 5 is a graph showing how a change of phase lowers the power applied to an output circuit.

FIG. 6 is a schematic diagram of connections of one form of the invention.

Figure 7:
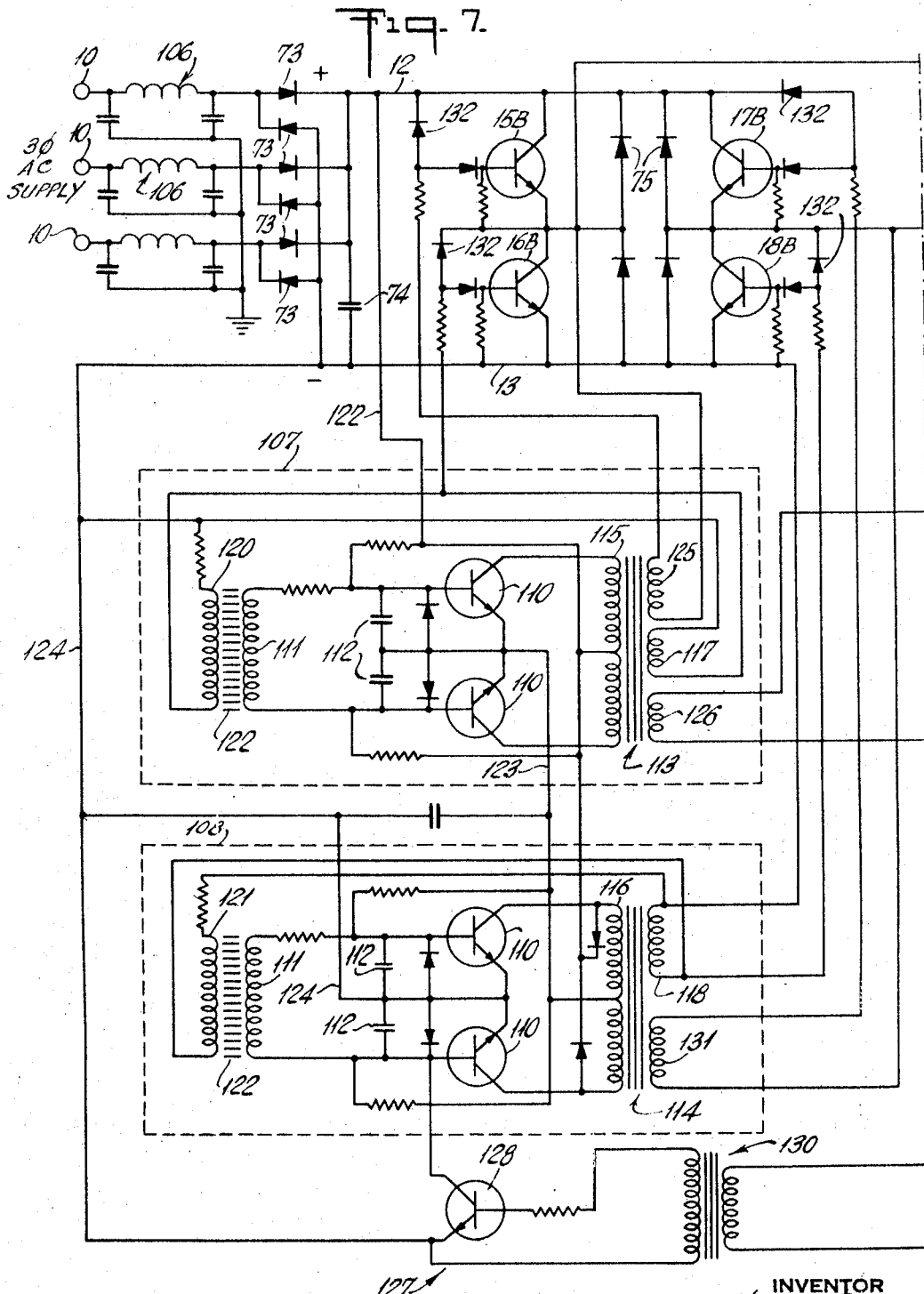

FIGS. 7 and 8, when placed side by side, is a schematic diagram of connections of another form of the invention, including two oscillators and various other circuit components having additional protective features.

Referring now to FIG. 1, the general circuit includes input terminals 10 which are to be connected to a source of three phase alternating current power. Single phase or two phase power may be employed if necessary and it is within the scope of the invention to derive the input power from a direct current generator. Coupled to the input terminals is a three phase rectifier which supplies direct current power to output conductors 12 and 13. Connected across these conductors is a bridge circuit 14 including four semiconductor switches 15, 16, 17 and 18 which can be controlled to either pass full current from conductors 12 and 13 or to block the current completely.

Switches 15 and 16 are connected in series across conductors 12 and 13 and have their control circuits connected respectively to a first secondary winding 20 and a second secondary winding 21 so that switch 15 is turned on to pass current at the same time that switch 16 is turned off to block all current flow. Secondary windings 20 and 21 are coupled to a primary winding 22 which is connected to the output terminals of an oscillator 23 arranged to oscillate at a relatively high frequency such as 20,000 hertz. The oscillator may derive its input from the output of the rectifier circuit 11 or from any other convenient source of power. Output winding 22 is connected across a capacitor 24 which forms a resonant circuit at the frequency of the oscillator.

A phase adjuster circuit 25 is coupled to output winding 21, which is connected in parallel with a capacitor 26 for establishing a zero phase relationship with oscillator 23. The output of the phase adjuster circuit 25 is connected to a primary winding 27 connected in parallel to a capacitor 28. Two secondary windings 30 and 31 are magnetically coupled to winding 27 and electrically connected to switches 18 and 17, respectively. Windings 30 and 31 are poled so that, if the change in phase is zero, switch 18 is turned on at the same time that switch 15 is turned on and switch 17 is turned on and off during the same time intervals as switch 16 (see FIG. 5).

The conductors which connect switches 15, 16 and 17, 18 form the two opposite junction points of the switch array 14 and these conductors are connected to a primary winding 32 of an output transformer 33 having a secondary winding 34 connected to a rectifier 35. From the above description it will be obvious that when there is no change of phase introduced by circuit 25, switches 15 and 18 will be made conductive in unison and at the same time switches 16 and 17 are made non-conductive. On the alternate part of the cycle switches 15 and 18 are made non-conductive while switches 16 and 17 are made conductive. This arrangement produces a maximum voltage square wave which is applied to winding 32 and to rectifier 35, the output of which appears across load terminals 36, 37 as a maximum direct current voltage.

A control circuit 38 is coupled to the output terminals 36, 37 and includes a voltage reference which may be a Zener diode, a battery, or any other form of voltage reference which may be used to generate an error voltage. If the voltage at the output terminals is too high, the control circuit 38 sense a direct current over its output conductors 40 and 41 to winding 42 which is part of the output transformer connected to the oscillator 23. The introduction of direct current through winding 42 changes the saturation of core 19 and thereby alters the phase of the resonant circuit 22, 24. Thus, a change of phase is also effected in the resonant circuit 21, 26 and in the phase control circuit 25, thereby changing the phase of the output wave which is applied to windings 30, 31 and switches 17 and 18. The change of phase of the voltage applied to switches 17 and 18 results in a square-topped wave of reduced power being applied through transformer 33 and rectifier 35 to the output terminals. In FIG. 1 and in the detailed drawing of this circuit (FIG. 6), the direct current of the control circuit is applied only to two resonant circuits, 22, 24 and 21, 26. This control can be used to vary the output voltage over a considerable range of voltage values but if greater control is necessary, a second control winding may be applied to core 29 to vary the saturation of the output circuit 27, 28 and change its resonant value. With this triple control, an extended range of voltage values may be obtained by the circuit shown in FIG. 1.

FIG. 5 shows how the change of phase results in a reduced power output. The left side of the graph shows current pulses 45 and 46 occurring at the same time and producing a positive pulse 47 in the winding 32. During the negative portion of the applied wave, pulses 48 and 50 pass through switches 17 and 16 and produce a negative pulse 51 in winding 32. The combination of pulses 47 and 51 produce the maximum power applied to the rectifier 35 and load terminals 36 and 37.

When the control circuit 38 sends a direct control current to winding 42, the saturation of core 19 is altered and the inductance of windings 21 and 22 are varied, thereby changing the resonance of the two tuned circuits. This action produces a phase change in the voltage pulses applied to switches 17 and 18 causing these switches to be made conductive during different time intervals. The right hand portion of FIG. 5 illustrates the condition when a 90 degree phase shift results. Pulses 52 and 53 combine to produce a shorter output pulse 54 because switches 15 and 18 are simultaneously conducting for a shorter period. In a similar manner the negative pulse 55 results when pulses 56 and 57 are offset in time relationship.

FIGS. 2 and 3 illustrate one form of saturable reactor whose inductance can be controlled by a direct current. The main winding 60 is wound on a saturable core 61 which may have an airgap 62. An outer ferromagnetic cylinder 63 helps to lower the reluctance and protect the winding from external magnetic fields. A direct current spool 64 is positioned around a portion of the main winding and a control winding 65 placed on it. Direct current through winding 65 causes saturation of a part of the core 61 and alters the inductance.

FIG. 4 is another form of a saturable reactor which can be used for either of the saturable inductors 22 or 27. Windings 66 and 67 can be connected in series, aiding to form the variable inductance while the central winding 68 is the control winding connected to a direct current source. The core 70 may be made of laminations of saturable ferromagnetic material or bonded ferrite material.

The control circuit shown in FIG. 6 is similar to FIG. 1 except that the details of the various parts are shown. The three phase input terminals 10 are connected to a rectifier 11 comprising six semiconductor diodes 73 and connected to a smoothing capacitor 74. The four switches in array 14 are semiconductor transistors 15A, 16A, 17A, and 18A. An added diode 75 is connected to the emitter and collector electrodes of each switch to pass the negative voltage pulses generated in the secondary windings 20, 21, 30 and 31 when the current is abruptly cut off. The four transistors form a bridge circuit with two opposite junction points connected to the D.C. supply conductors and the other two junction points connected to primary winding 32 on output transformer 33.

Transformer 33 has a secondary winding 34 as before connected to a rectifier 35 and output terminals 36 and 37. The output rectifier includes two diodes 76 and 77, a smoothing inductance 78, and two filtering capacitors 80. Two additional secondary windings 81 and 82 are provided for furnishing direct current to one or more transistors in the control circuit 38. Each of these secondaries is coupled to diode rectifiers for providing direct current.

The oscillator 23 includes a transistor 83 having its base and emitter electrodes coupled to a resonant circuit including the primary winding 22 and a capacitor 24. A regulating transistor 84 coupled to a Zener diode 85 provides the oscillator with a regulated voltage.

The phase adjusted circuit 25 receives its input energy from secondary winding 21, the same winding that provides switch 16A with a control voltage. Winding 21 is coupled through a capacitor 86 to a resonant circuit 87 comprising a primary winding 90 and a capacitor 88. Winding 90 is on a saturable core 91, the permeability of which can be varied by the direct current in a secondary winding 42. Another secondary winding 92 applies the input voltage to two transistors 93 and 94 coupled together to present a high impedance input circuit. The output circuit of the phase adjuster includes the resonant combination of capacitor 28 and winding 27. Secondary windings 30 and 31 are connected directly to transistor switches 17A and 18A.

The phase shift is accomplished by driving transistors 15A and 16A directly from the oscillator output. If the output circuit 22, 24, the input circuit 88, 90, and the phase adjusted output circuit 27, 28, are all in resonance, there will be a 90 degree phase shift between the oscillator output and the input to the phase adjuster. Also, there is a 90 degree phase shift between circuits 87 and output 27, 28. Under this condition the windings are phased so that transistors 15A and 18A conduct simultaneously and full output is applied to winding 32. If the resonant circuit 87 is detuned by changing its inductance (by changing the core saturation) the phase shift is altered and the output current is reduced. If resonant circuit 27, 28 is also detuned, by using a similar saturable core and a direct current control winding, an additional change in phase shift is made and the output current through winding 32 can be reduced to zero. In all cases the phase shift is controlled by the amount of direct current in winding 42, this current being proportional to the error voltage produced by the control circuit 38.

The control circuit 38 in FIG. 6 includes a first voltage divider comprising three resistors 95, 96 and 97. Resistor 96 is provided with a sliding contact 98 for adjusting the output voltage. A second voltage divider circuit includes a resistor 100 and a Zener diode 101, the Zener diode being the voltage reference which comprises the basic control component. The mid-points of these to voltage dividers are compared by a sensing circuit which includes two transistors 102 and 103 and an error voltage is thereby produced at the collector electrode of transistor 102. The error voltage is amplified by transistors 104 and 105 and the resulting current is applied through rectifier circuit 82 to the direct current winding 42 to alter the inductance and phase of circuit 87 and thereby restore the output at terminals 36, 37 to the pre-determined value. Rectifier circuit 81 supplies transistors 102, 103 and 104 with direct current and also supplies current to the second voltage divider.

The voltage regulator circuit shown in FIG. 6 includes a sine wave generator and phase changing circuits which operate only with sine waves. The control of the switching components 15, 16, 17 and 28 by sine waves results in some lost time because the switch components are not operated until the sine wave has proceeded to supply the required voltage. A square topped wave system can eliminate this lost time characteristic, but in addition to generating square topped waves, a different system of phase control must be provided for varying the voltage output.

FIGS. 7 and 8, when combined, show one form of circuit which uses square topped waves. Input terminals 10 are for the application of three phase AC power as before. Rectifier components 73 rectify this supply and apply direct current power to the bridge switches 15B, 16B, 17B and 18B. In this circuit, three low pass filter circuits 106 are connected in series between the terminals 10 and the rectifier units 73 to prevent the high frequency currents generated by the oscillators from leaking into the power supply system.

Two oscillators 107 and 108 are provided. Each oscillator circuit includes two transistors 110, a resonant circuit comprising an inductance 111 and capacitors 112, and output transformers 113 and 114. Each output transformer includes primary windings 115 and 116 and at least one secondary winding 117 and 118 used to provide a feedback to maintain the circuit in oscillation. For this purpose, and to produce a square topped wave, windings 117 and 118 are connected to the primary windings 120 and 121, coupled to secondary windings 111 by a saturated core 122. The current supply for the transistors 110 is supplied by the rectifier components 73. The supply circuit may be traced from this positive conductor 12, over conductor 122 to the center point of winding 115, then through the collector and emitter electrodes of the transistors in the oscillator 107, over a conductor 123 to the center point of winding 116, and finally through the collector-emitter elecrodes of transistors 110 of oscillator 108 and back to the negative supply conductor 13 by way of conductor 124.

Oscillator 107 is running free at a high frequency of about 20,000 hertz. One secondary winding 125 is connected directly to the base and emitter electrodes of switch transistor 15B. A second secondary winding 117 is connected to the base and emitter electrodes of switch transistor 16B. The windings are poled so that the switches are made conductive on alternate halves of the wave. A third secondary winding 126 supplies a reference wave to the regulator circuit shown in FIG. 8. The second oscillator is tuned so that it would normally oscillate at a slightly lower frequency than oscillator 107 but it is controlled by an additional feedback circuit 127 which includes a transistor 128 and a transformer 130. The primary of this transformer is connected to the output of the regulating circuit. A control pulse is applied to the transformer 130 and transistor 128 to start a pulse at the desired time to produce a phase difference which will produce the required output voltage. A first secondary winding 118 on output transformer 114 is connected to the base and emitter electrodes of switch transistor 18B. A second secondary winding 131 is connected to the base and emitter electrodes of switch transistor 17B. Windings 118 and 131 are poled so that the switches are made conductive on alternate halves of the wave.

When the switch transistors 15B, 16B, 17B and 18B are controlled by a square wave to make their collector-emitters conductive or non-conductive it is desirable to have a steep rise and an abrupt fall of the switch resistance. The steep rise requires only a similar applied square-topped wave. An abrupt fall can be obtained only if there is no excess supply of carriers in the transistor supplied by an over-current impressed on the base. To insure that this condition cannot happen, a diode 132 is bridged across the base supply conductor and the collector of each switch transistor. When the applied voltage to the base exceeds the normal operating voltage, which in this case is 0.6 volt, the excess is shunted around the base and the current produced by the excess voltage passes through the collector and emitter electrodes.

The array of bridge transistors have their two opposite junction points connected to primary winding 32 (see FIG. 8) of transformer 33. The secondary winding 34 of this transformer is connected to a rectifier 133, a low pass filter 78, 80, load terminals 36, 37 and a load 134. A small resistor 135 is connected in series with the negative supply line to provide a potential drop when overload currents are taken by the load. A transistor 136 has its emitter connected to one side of resistor 135 and its base coupled to the other side of the resistor. Under normal conditions no current flows through the transistor but in cases of load short circuit or other heavy current, the potential drop across resistor 135 is applied to the base electrode and the emitter-collector circuit is made conductive, thereby causing a current to flow in the base circuit of transistor 137. A Zener diode 138 is connected in series with the base of transistor 136 to provide a voltage reference which blocks current to the base of transistor 136 during normal operation but permits current to flow under short circuit conditions.

The regulator circuit comprises a bridge including two arms. One arm comprises resistors 140 and 141 connected across the output terminals in series with a diode 142. The junction of these two resistors is connected to the gate electrode of a field effect transistor 139 and the voltage variations of the output are applied to this component. A second bridge arm includes a resistor 143, a variable voltage divider 144, and two voltage reference components 145 and 147 which in this case are Zener diodes. The voltage divider 144 is connected across diode 147 and has its adjustable contact connected to the gate electrode of a second field effect transistor 146.

There may be times, due to large changes in the load or short circuits, when large pulses are applied to the first voltage divider. To protect the field effect transistor 139, capacitors 109 and 119 are connected across the load terminals in series and a Zener diode 129 is connected across capacitor 119. A negative surge applied across this capacitor will be by-passed by the Zener diode and the transistor 139 will not be damaged.

The two field effect transistors 139 and 146 form the unbalance detector of the bridge which generates an error current transmitted over conductor 148 to the base of transistor 137. The source electrodes of the field transistors 139 and 146 are connected together and to the collector of transistor 150. Transistor 150 has its base and emitter electrodes joined by a circuit which includes the voltage reference Zener diode 145, a diode 142, and limiting resistor 151. Because of this connection, transistor 150 is a constant current component and maintains the sum of the source-to-drain currents at a constant value.

Winding 126 in oscillator 107 transmits a square topped wave to conductors 152 and 153 (FIG. 8). Conductor 152 is in series with capacitor 171 which differentiates the square pulse, producing sharp positive and negative pulses. A delay network comprising a capacitor 159 and resistor 169 delays the pulse before it is applied to transistor 160. Prior to the application of the pulse to transistor 160, a differentiated pulse is applied through capacitor 162 through diode 163 to the base of transistor 164. Transistor 164 is a comparator and receives two current values to determine the phase control of oscillator 108.

The error current transmitted over conductor 148, transistor 137, and conductor 165 charges capacitor 166 to a voltage proportional to the error current. As capacitor 166 charges up, a voltage is reached which makes transistor 164 conductive and the collector voltage of this transistor drops and this drop in voltage is differentiated by capacitor 167 and then applied to the base of transistor 168, then to the base of transistor 170, and finally to transformer 130, transistor 128, and oscillator 108. The pulse transmitted by transistor amplifiers 168, 170, and 128 are sharp positive pulses and when amplified and applied to oscillator 108, they start the formation of a square topped wave having a phase delay which is proportional to the error voltage and therefore adapted to produce a change in the output voltage to reduce the error voltage.

The current supplied by winding 126 (FIG. 7) is used to provide power and desired wave shapes to various parts of the regulator circuit in FIG. 8. The wave applied to conductor 152 is square topped and a portion of this is used to provide operating current, rectified by diode 155, to transistors 164, 168 and 170. The differentiated pulse passing through capacitor 171 is applied to the base of transistor 160 and the output pulses from this transistor are applied to the base of transistor 164 where they are added to the "ramp" or saw tooth pulses generated by the circuit which includes capacitor 162, diode 163, resistor 165, and capacitor 166. The result is a "ramp" voltage terminated by a sharp pulse. The end pulse insures that conduction will always be produced in transistor 164 to generate the control pulse which starts oscillator 108.

The essential components of the circuit are shown in FIG. 1 which represents one form of the invention. The circuit shown in FIGS. 7 and 8 contains many protective features which should not be interpreted as limiting the invention.

What is claimed is:

1. A phase-controlled voltage regulator comprising:
   (a) means for providing direct current power to a pair of input terminals;
   (b) four semiconductor switches connected in the form of a four-armed bridge and having two opposite junction points connected to said input terminals;
   (c) a first oscillator for generating alternating current at a frequency within the range of 600 to 100,000 hertz and having output coupling circuits connected to a first pair of said switches connected across the input terminals for alternately turning the switches on and off during each cycle;
   (d) a second oscillator coupled to said first oscillator for generating alternating current having the same frequency as said first oscillator and having output coupling circuits connected to a second pair of said switches also connected across the input terminals for alternately turning the switches off and on during each cycle;
   (e) an output circuit connected to opposite junction points in the first and second pairs of bridge switches and coupled to a pair of output terminals which are to be connected to a load;
   (f) a sensing circuit for determining the output voltage, said circuit including a voltage reference component connected to a bridge circuit for determining an error voltage above or below a desired output regulated voltage;
   (g) a constant current circuit connected in series with a capacitor for charging the capacitor during each cycle at a constant rate and thereby producing a voltage which increases with time at a linear rate;
   (h) and a comparator circuit coupled to the voltage reference component and said constant current circuit for comparing the error voltage and the linear rate voltage and for sending an operating pulse to said second oscillator circuit to change its phase with respect to the first oscillator and thereby adjust the output voltage to a regulated value.

2. A voltage regulator as claimed in claim 1 wherein the phase of the second oscillator is changed by means of a starting pulse applied to the base electrodes of two transistors in said second oscillator.

3. A voltage regulator as claimed in claim 1 wherein said means for providing a source of direct current power is a rectifier circuit having input terminals connected to a source of alternating current power.

4. A voltage regulator as claimed in claim 1 wherein said both of said oscillators received power from said source of direct current power.

5. A voltage regulator as claimed in claim 1 wherein said load is coupled to said two bridge junction points by an output transformer.

6. A voltage regulator as claimed in claim 5 wherein a rectifier is connected between said output transformer and the output terminals.

7. A voltage regulator as claimed in claim 6 wherein a Zener diode is coupled to the output terminals to act as a voltage reference.

8. A voltage regulator as claimed in claim 7 wherein said Zener diode is part of a voltage divider circuit and is coupled to an adjustable voltage divider for determining said error voltage, said adjustable voltage divider circuit adapted to regulated output voltage to a predetermined voltage value.

References Cited

UNITED STATES PATENTS

| | | | |
|---|---|---|---|
| 3,189,813 | 6/1965 | Frierdich | 321—45 |
| 3,247,447 | 4/1966 | Flairty | 321—14 |
| 3,309,600 | 3/1967 | Wellford | 321—45 |
| 3,311,807 | 3/1967 | Rodaer | 321—18 |
| 3,317,812 | 5/1967 | Mesenhimer | 321—16 |
| 3,346,798 | 10/1967 | Dinger | 321—18 |
| 3,378,751 | 4/1968 | Walker | 321—18 XR |

JOHN F. COUCH, Primary Examiner

W. M. SHOOP, Jr., Assistant Examiner

U.S. Cl. X.R.

321—5, 11, 45; 323—22

PO-1050
(5/69)

UNITED STATES PATENT OFFICE
CERTIFICATE OF CORRECTION

Patent No. 3,460,020  Dated August 5, 1969

Inventor(s) HALSEY P. QUINN

It is certified that error appears in the above-identified patent and that said Letters Patent are hereby corrected as shown below:

Col. 2, Line 18: "power" omitted after "input"

Col. 4, Line 41: "to" should read --two--

Col. 5, Line 15: "elecrodes" should read --electrodes--

Col. 6, Line 56: "pulse" should read --pulses--

Col. 8, Line 28 (Claim 8): "adjust the" omitted before "regulated"

SIGNED AND
SEALED
MAR 31 1970

(SEAL)
Attest:

Edward M. Fletcher, Jr.
Attesting Officer

WILLIAM E. SCHUYLER, JR.
Commissioner of Patents